United States Patent [19]

Slotvinsky-Sidak et al.

[11] 4,039,614

[45] Aug. 2, 1977

[54] METHOD OF PREPARING VANADIUM PENTOXIDE FROM METALLURGICAL SLAGS CONTAINING VANADIUM

[76] Inventors: Nikolai Petrovich Slotvinsky-Sidak, Ambulatorny pereulok, 17, kv. 54, Moscow; Naum Volfovich Grinberg, ulitsa Otakara Yarosha, 53, kv. 69, Kharkov, both of U.S.S.R.

[21] Appl. No.: 660,392

[22] Filed: Feb. 23, 1976

Related U.S. Application Data

[63] Continuation of Ser. No. 571,597, April 25, 1975, abandoned, which is a continuation of Ser. No. 379,982, July 17, 1973, abandoned.

[30] Foreign Application Priority Data

July 17, 1972 U.S.S.R. .............................. 1810744

[51] Int. Cl.² ........................................... C01G 31/00
[52] U.S. Cl. ....................................... 423/65; 423/68; 423/592; 71/31; 71/33; 71/48
[58] Field of Search .................. 423/62, 68, 65, 592; 75/97 R, 101 R

[56] References Cited

U.S. PATENT DOCUMENTS

| 2,168,169 | 8/1939 | Mayer | 423/68 |
| 2,183,027 | 12/1939 | Mayer | 423/68 |
| 2,197,241 | 4/1940 | Hatherell | 423/68 |
| 2,822,240 | 2/1958 | Dunn et al. | 423/68 |
| 3,840,637 | 10/1974 | Hendwick et al. | 423/68 |

FOREIGN PATENT DOCUMENTS

| 45-40165 | 12/1970 | Japan | 423/68 |

Primary Examiner—Herbert T. Carter

[57] ABSTRACT

A method for extracting vanadium pentoxide from metallurgical slags containing vanadium with a ratio of ($V_2O_5$/CaO) being greater than 0.05 including roasting in an oxidizing medium a slag which has been disintegrated to a particle size less than 0.1 mm and then processing the roasted particles with solutions of phosphoric acid containing from 5 to 20 per cent by weight of $H_3PO_4$, with a liquid-to-solid ratio of from 2–10:1 at a temperature of from 50° – 100° C for a period of time from 30 to 120 minutes.

2 Claims, No Drawings

METHOD OF PREPARING VANADIUM PENTOXIDE FROM METALLURGICAL SLAGS CONTAINING VANADIUM

This is a continuation of application Ser. No. 571,597 filed Apr. 25, 1975 which in turn is a continuation of Ser. No. 379,982 filed July 17, 1973 both now abandoned.

BACKGROUND OF THE INVENTION

This invention relates to methods for extracting vanadium pentoxide from vanadium-containing materials. These methods are widely used in non-ferrous metallurgy, and particularly in hydrometallurgy.

A method is known in the prior art for isolating vanadium pentoxide from materials containing vanadium, in which the vanadium-containing metallurgical slags, disintegrated to a particle size of less than 0.1 mm and rotated in an oxidizing medium, are processed with a solution of sulphuric acid see for example 'Chemistry of Rare and Scattered Elements', edited by K. A. Bolshakov, Higher School Publishers, Moscow, 1969, vol. II, p. 486).

The known method, however, does not ensure the desired degree of vanadium extraction, especially from slags containing large amounts of calcium oxide.

Moreover, the known method makes it impossible to utilize in agriculture (as fertilizers) the solid residue containing, in addition to microelements such as vanadium, manganese and others, calcium oxide in the form of gypsum.

Furthermore, the known method limits the calcium oxide content of slags (due to difficult filtration) which makes it impossible to prepare them by a single-step process.

SUMMARY OF THE INVENTION

The primary object of the invention is to provide method which ensures a higher degree of extraction of vanadium pentoxide from metallurgical slags.

Another essential object of the invention is to ensure the subsequent use of the slags, after the extraction of the vanadium therefrom, in agiculture in the form of complex fertilizers containing phosphates and microelements such as vanadium, manganese, titanium and other elements.

Still another important object of the invention is to reduce the number of operations involved in the extraction of vanadium concentrates from slags rich in lime.

These and other objects of the invention have been attained in a process for extracting vanadium pentoxide from metallurgical slags containing vanadium in which the metallurgical slags having a ratio of ($V_2O_5$ CaO) greater than 0.05 are first disintegrated to a particle size of less than 0.1 mm, roasted in an oxidizing medium, and processed with a solution of phosphoric acid containing from 5 to 20 percent by weight of $H_3PO_4$, with a liquid-to-solid ratio being 2-10:1. The acid treatment is carried out at a temperature of from 50° – 100° C for a period of from 30 to 120 minutes.

This method ensures the transfer of from 80 to 92 percent of vanadium into solution, the enrichment of the solid residue containing the microelements, vanadium, manganese, titanium and other elements, with the phosphorus compounds.

DETAILED DESCRIPTION OF THE PREFERRED EMBODIMENT

For a better understanding of the invention, the following examples are given by way of illustration which, however, fall within the scope of the invention.

EXAMPLE 1

Converter slag containing 22 percent of $V_2O_5$ and 1.5 percent of CaO (percent by weight) was roasted in an oxidizing medium after being disintegrated to a particle size of less than 0.1 mm, and then processed with a solution of phosphoric acid having a concentration of 8 percent by weight and a liquid-to-solid phase ratio of 7:1 at a temperature of 60° C for 30 minutes. 92 percent of the vanadium was transferred into solution and the concentration of the $V_2O_5$ in the solution was 26.5 g/liter. The solid residue contained 1.8 percent by weight of $V_2O_5$, 6 percent by weight of MnO, and 12.3 percent by weight of $P_2O_5$.

EXAMPLE 2

Converter slag containing 12 percent by weight of $V_2O_5$ and 20 percent by weight of CaO was roasted in an oxidizing medium after being disintegrated to a particle size of less than 0.1 mm, and then processed with a solution of phosphoric acid having a concentration of 12 percent by weight and a liquid-to-solid ratio of 3:1 at a temperature of 80° for 30 minutes. 88 percent of the vanadium was transferred into solution and the concentration of the $V_2O_5$ in the solution was 34 g/liter. The solid residue contained 1.6 percent by weight of $V_2O_5$, 6.5 percent by weight of MnO and 14 percent by weight of $P_2O_5$.

EXAMPLE 3

Converter slag containing 4 percent by weight of $V_2O_5$, 36 percent by weight of CaO and 6 percent by weight of $P_2O_5$ was fired in an oxidizing medium after being disintegrated to a particle size of less than 0.1 mm, and then processed with a solution of phosphoric acid having a concentration of 16 percent by weight and a liquid-to-solid ratio of 2:1 at a temperature of 85° C for 120 minutes. 80 percent by weight of the vanadium was transferred into solution and the concentration of $V_2O_5$ in solution was 16 g/liter. The solid residue contained 0.8 percent by weight of $V_2O_5$ and 18 percent by weight of $P_2O_5$.

EXAMPLE 4

Vanadium slag containing 0.1 percent by weight of $V_2O_5$, 31 percent by weight of CaO, 7.5 percent by weight of $P_2O_5$, 18 percent by weight of $Fe_2O_3$, 16 percent by weight of $SiO_2$, 6.5 percent by weight of MnO, 1.3 percent by weight of $Cr_2O_3$, 5.5 percent by weight of $TiO_2$, 4 percent by weight of MgO and 3.5 percent by weight of $Al_2O_3$ was fired in an oxidizing medium, then processed with a 10 percent solution of phosphoric acid having a liquid-to-solid ratio of 1:3 at a temperature of 40° C for 35 minutes. 87.5 percent of the vanadium was thus transferred into solution. The precipitate of vanadium pentoxide was isolated from the solution by known methods. The precipitate also contained (in addition to 94 percent of $V_2O_5$) 0.05 percent by weight of $P_2O_5$ and also calcium phosphate containing 1.1 percent by weight of $V_2O_5$ and 2 percent by weight of MgO. The calcium phosphate can be used as fertilizer.

After the extraction of vanadium, the slag residue containing 15 percent by weight of $P_2O_5$, 1.1 percent by weight of $V_2O_5$, 4.2 percent by weight of $MnO_2$ and oxides CaO, LgO, $Fe_2O_3$, $Cr_2O_3$, $SiO_2$ and $TiO_2$ can be used as fertilizer.

EXAMPLE 5

Vanadium slag roasted with lime in an oxidizing medium and containing 17.7 percent by weight of $V_2O_5$, 8.5 percent by weight of CaO, 35 percent by weight of $Fe_2O_3$, 2.5 percent by weight of MgO, 1.8 percent by weight of $Cr_2O_3$, 5.8 percent by weight of $TiO_2$, 6.2 percent by weight of MnO, 17 percent by weight of $SiO_2$ and 1.7 percent by weight of $Al_2O_3$ was processed with a solution of phosphoric acid having a liquid-to-solid ratio of 2:1 at a temperature of 40° C for 30 minutes. 97.5 percent of the vanadium was transferred into solution, with the $V_2O_5$ content of the solid residue being 0.4 percent. The solid residue was removed from the solution, and then phosphorus and vanadium were isolated separately by the known methods. The precipitate of vanadium pentoxide obtained contained 95.1 percent by weight of $V_2O_5$, the rest being calcium, manganese and other admixtures.

The proposed method ensures the extraction of 87–97 percent of vanadium from slags, with the solid residue being converted into a valuable complex fertilizer. The proposed method also simplifies the devanadization of cast iron by replacing the duplex-process by a mono-process. The new method reduces also the cost of iron and vanadium pentoxide.

The proposed method can be realized on an industrial scale at plants where converter slags are available.

What we claim is:

1. A method for extracting vanadium pentoxide from metallurgical slags containing vanadium comprising: disintegrating a metallurgical slag containing vanadium and having a ratio of $V_2O_5$/CaO greater than 0.05 to form particles of a size of less than 0.1 mm; roasting the slag particles in an oxidizing medium; processing the roasted particles with a solution of phosphoric acid having a concentration of $H_3PO_4$ within the range of from 5 to 20 percent by weight and a liquid to solid ratio by weight of 2–10:1 at a temperature of from 50°–100° C for a period of from 30 to 120 minutes to transfer vanadium as vanadium pentoxide into solution; separating the vanadium pentoxide in solution from a solid residue; and recovering the vanadium pentoxide from the solution.

2. The method for extracting vanadium pentoxide from vanadium containing metallurgical slags as claimed in claim 1 wherein the solid residue contains phosphates and vanadium, manganese and titanium values.

* * * * *